US012802092B2

(12) United States Patent
Fuchs

(10) Patent No.: US 12,802,092 B2
(45) **Date of Patent: *Nov. 17, 2026**

(54) THIRD-PARTY TESTING PLATFORM

(71) Applicant: eBay Inc., San Jose, CA (US)

(72) Inventor: Gilad Eliyahu Fuchs, Kfar-Saba (IL)

(73) Assignee: eBay Inc., San Jose, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 19/069,916

(22) Filed: Mar. 4, 2025

(65) Prior Publication Data

US 2025/0200598 A1 Jun. 19, 2025

Related U.S. Application Data

(63) Continuation of application No. 18/089,820, filed on Dec. 28, 2022, now Pat. No. 12,248,955, which is a (Continued)

(51) Int. Cl.
*G06Q 30/02* (2023.01)
*G06Q 10/063* (2023.01)

(Continued)

(52) U.S. Cl.
CPC ..... *G06Q 30/0203* (2013.01); *G06Q 10/0637* (2013.01); *G06Q 30/0243* (2013.01)

(58) Field of Classification Search
None
See application file for complete search history.

(56) References Cited

U.S. PATENT DOCUMENTS 10,747,651 B1 * 8/2020 Vanderwall ......... G06F 11/3684
11,379,859 B1 * 7/2022 Powers .............. G06Q 30/0201

(Continued)

FOREIGN PATENT DOCUMENTS

CN 110675174 A * 1/2020 ......... G06Q 30/0241

OTHER PUBLICATIONS

K. Wiklund, D. Sundmark, S. Eldh and K. Lundvist, "Impediments for Automated Testing—An Empirical Analysis of a User Support Discussion Board," 2014 IEEE Seventh International Conference on Software Testing, Verification and Validation, Cleveland, OH, USA, 2014, pp. 113-122 (Year: 2014).*

*Primary Examiner* — Jerry O'Connor
*Assistant Examiner* — Philip N Warner
(74) *Attorney, Agent, or Firm* — Shook, Hardy & Bacon L.L.P.

(57) ABSTRACT

Systems and methods for conducting a test on a third-party testing platform are provided. A networked system causes presentation of a setup user interface to a third-party user, whereby the setup user interface includes a field for indicating an attribute of a publication to be tested. The networked system receives, via the setup user interface, an indication of the attribute, a subject to be tested, and one or more test parameters. The networked system applies the attribute change to a first version of the publication to generate a second version of the publication. The first version is presented to a first subset of potential users and the second version is presented to a second subset of potential users. Interactions with both the first version and the second version are monitored and analyzed to determine results of the test. The results are then presented to the third-party user.

20 Claims, 6 Drawing Sheets

Related U.S. Application Data continuation of application No. 16/377,327, filed on Apr. 8, 2019, now Pat. No. 11,568,430.

(51) Int. Cl.

| | |
|---|---|
| ***G06Q 10/0637*** | (2023.01) |
| ***G06Q 30/0203*** | (2023.01) |
| ***G06Q 30/0242*** | (2023.01) |

(56) References Cited

U.S. PATENT DOCUMENTS

| | | | | |
|---|---|---|---|---|
| 11,521,077 | B1 * | 12/2022 | Kapoor | G06N 20/00 |
| 11,568,430 | B2 | 1/2023 | Fuchs | |
| 12,248,955 | B2 * | 3/2025 | Fuchs | G06F 11/3438 |
| 2008/0294996 | A1 * | 11/2008 | Hunt | G06Q 30/02 707/999.102 |
| 2009/0281989 | A1 * | 11/2009 | Shukla | G06F 16/972 |
| 2014/0330636 | A1 * | 11/2014 | Moran | G06F 3/0425 705/14.43 |
| 2015/0012852 | A1 * | 1/2015 | Borodin | G06F 11/3688 715/762 |
| 2016/0225063 | A1 * | 8/2016 | Wical | G06Q 30/0631 |
| 2018/0122256 | A1 * | 5/2018 | Smith | G09B 7/00 |
| 2018/0173606 | A1 * | 6/2018 | Malla | G06F 11/3672 |
| 2019/0034976 | A1 * | 1/2019 | Hamedi | G06Q 30/0243 |
| 2019/0052551 | A1 * | 2/2019 | Barczynski | H04L 41/046 |
| 2019/0107521 | A1 * | 4/2019 | Riley | G01K 3/14 |
| 2019/0163612 | A1 * | 5/2019 | Michalski | G06F 11/368 |
| 2019/0378621 | A1 * | 12/2019 | Ellison | G06F 3/011 |
| 2020/0097838 | A1 * | 3/2020 | Tsuchiya | G06F 16/9035 |
| 2020/0342962 | A1 * | 10/2020 | Menhardt | G16H 10/40 |

* cited by examiner

THIRD-PARTY TESTING PLATFORM

This application is a continuation of U.S. patent application Ser. No. 18/089,820, filed Dec. 28, 2022, which is a continuation of U.S. patent application Ser. No. 16/377,327, filed on Apr. 8, 2019, each of which is incorporated herein by reference in its entirety.

TECHNICAL FIELD

The subject matter disclosed herein generally relates to machines configured to provide a testing platform, and to technologies by which such special-purpose machines become improved compared to other machines that provide testing platforms. Specifically, the present disclosure addresses systems and methods to provide an A/B or A/B/C testing platform to third-party users of a networked system.

BACKGROUND

Conventionally, a third-party user of a networked system may receive recommendations for changing an aspect of their publication in order to obtain more interactions with the publication (e.g., more views, more click-thrus, more sales of an item described in the publication). Often time, the third-party users are reluctant to implement recommendations that they believe may adversely affect them. These third-party users do not currently have a mechanism that allows them to easily conduct a well-controlled experiment to test recommendations or changes to their publication.

BRIEF DESCRIPTION OF DRAWINGS

Various ones of the appended drawings merely illustrate example embodiments of the present invention and cannot be considered as limiting its scope.

DETAILED DESCRIPTION

Figure 1:
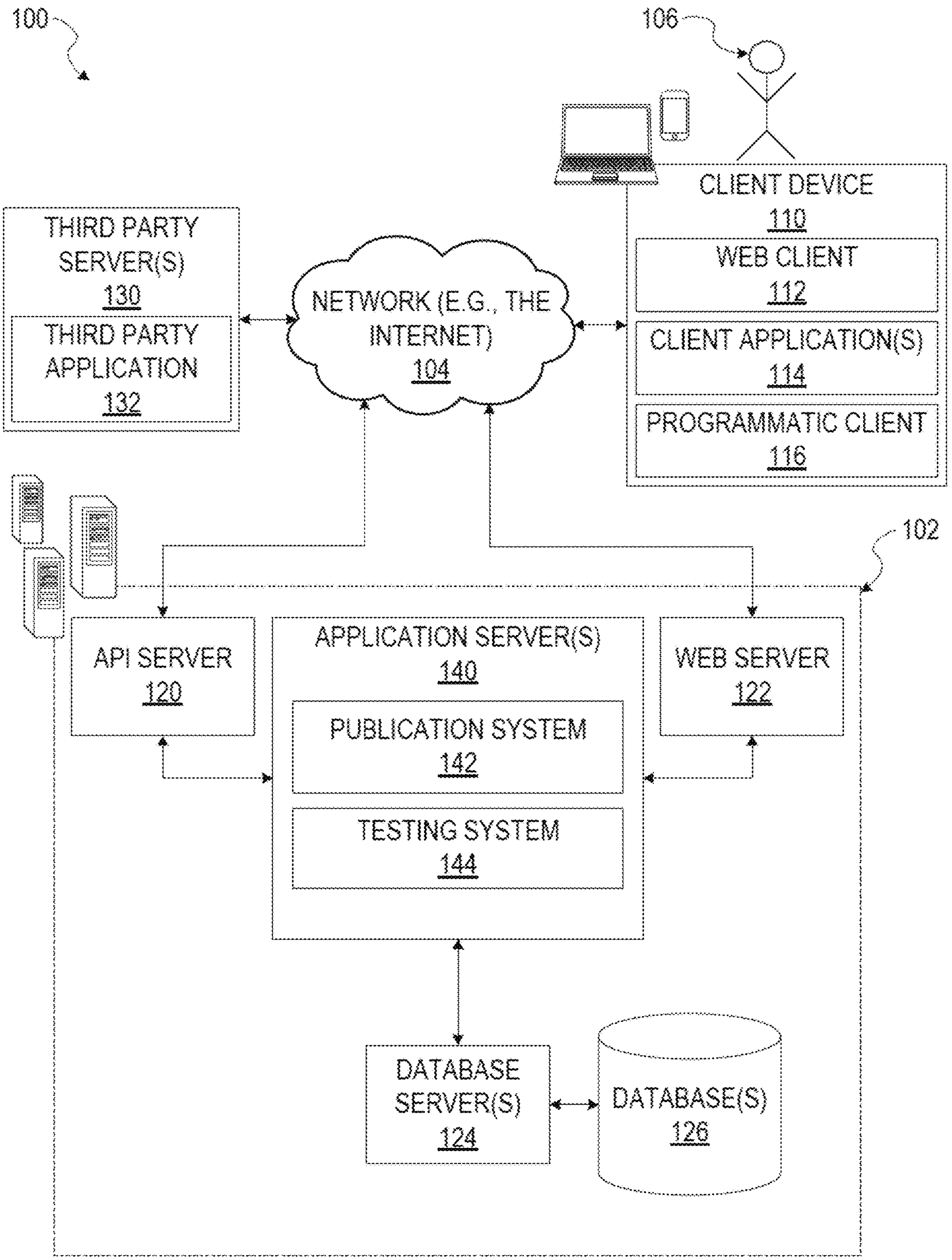
FIG. 1 is a diagram illustrating a network environment suitable for performing third-party testing, according to some example embodiments.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

A/B testing (e.g., bucket tests or split-run testing) is a randomized experiment with two variants, A and B. As such, A/B testing provides a way to compare two versions of a single variable, typically by testing response to variant A against variant B and determining which of the two variants is more effective. The two versions (A and B) are identical except for one variation that might affect a user's behavior. For example, version A may be a current version (control), while version B has a modified attribute (treatment). For instance, on a publication system associated with a marketplace, version A may be a publication or listing for an item being sold by a third-party user (e.g., seller), while version B may be essentially identical to version A except for a single change to one attribute, such as having a lower price or offering free shipping. As an extension, A/B/C testing allows for testing more variations of a particular element by using three or more versions.

The present disclosure provides technical solutions for allowing third-party users to test different versions of their publications or item listings in a controlled manner. In particular, an example testing system enable third-party users to set up an experiment or test, via a setup user interface, whereby the third-party user can provide one or more test parameters, a subject to be tested (e.g., a particular publication or a category of publications), and an attribute to be tested (e.g., the attribute that will be changed in a second version of the publication). Example embodiments also allow the third-party user to set up more than one test to be run at the same time by allowing the third-party user to provide one or more further attributes to be tested. The different versions of the publications are then generated and presented to randomly selected sub-populations or subsets of users (e.g., potential users or buyers). Interactions of the subset of users are monitored by the testing system and analyzed to obtain results. Based on the results, a recommendation may be provided to the third-party user suggesting an attribute that should be changed in the publication for all future potential users.

Conventionally, if the third-party user wants to test whether a change in an attribute would improve interactions with their publication (e.g., increase sales or views), the third-party user would manually change an attribute in the publication in order to generate a second version of the publication and post the original publication and the second version. The third-party user would then need to monitor the interactions with the publications. For a third-party user having hundreds of publications, it is virtually impossible to monitor all the publications and manage results. Additionally, the third-party user cannot, in these cases, determine which potential user sees which version of the publication.

As a result, one or more of the methodologies described herein facilitate solving technical problems associated with third-party testing on a networked system whereby a plurality of third-party users are using the networked system to present publications. In particular, by providing a testing system that automatically generates different versions of a publication based on user inputs, randomly selects subsets of user to present the different versions of the publication to, monitors interactions with the different versions, provides recommendations for adjusting the test, and provides recommendations for change the publication for all users based on the test results, example embodiments reduce efforts needed in order manually generate different versions of the publication, manually manage and monitor interactions with the different versions, and analyze the results of interactions with the different versions. As a result, resources used by one or more machines, databases, or devices (e.g., within an environment) may be reduced. Examples of such computing resources include processor cycles, network traffic, memory usage, data storage capacity, power consumption, network bandwidth, and cooling capacity.

With reference to FIG. 1, an example embodiment of a high-level client-server-based network environment 100 that provides an environment in which third-party testing may be implemented is shown. A networked system 102 provides server-side functionality via a communication network 104 (e.g., the Internet, wireless network, cellular network, or a Wide Area Network (WAN)) to one or more client devices 110. FIG. 1 illustrates, for example, a web client 112 operating via a browser (e.g., such as the Internet Explorer® browser developed by Microsoft® Corporation of Redmond, Washington State), and a programmatic client 116 executing on the client device 110.

The client device 110 may comprise, but is not limited to, a smartphone, tablet, laptop, multi-processor systems, microprocessor-based or programmable consumer electronics, game consoles, set-top boxes, or any other communication device that a user may utilize to access the networked system 102. In some embodiments, the client device 110 comprises a display module (not shown) to display information (e.g., in the form of user interfaces). In further embodiments, the client device 110 comprises one or more of a touch screen, accelerometer, camera, microphone, and Global Positioning System (GPS) device. The client device 110 is a device of a user 106, which is used to trigger processing of information and perform operations of the networked system 102.

In one embodiment, the networked system 102 includes or is linked to a network-based marketplace that manages goods, responds to requests for item listings, publishes publications comprising item listings of items available on the network-based marketplace, and manages payments for these marketplace transactions. The client device 110 interfaces with the networked system 102 via a connection with the network 104. Depending on the form of the client device 110, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or other types of networks).

In another example, the connection to the network 104 may be a Wireless Fidelity (Wi-Fi, IEEE 802.11x type) connection, a Worldwide Interoperability for Microwave Access (WiMAX) connection, or another type of wireless data connection. In such an embodiment, the network 104 may include one or more wireless access points coupled to a local area network (LAN), a wide area network (WAN), the Internet, or another packet-switched data network. In yet another example, the connection to the network 104 may be a wired connection (e.g., an Ethernet link), and the network 104 may be a LAN, a WAN, the Internet, or another packet-switched data network. Accordingly, a variety of different configurations are expressly contemplated.

In various embodiments, the data exchanged within the network environment 100 may be dependent upon user-selected functions available through one or more client or user interfaces (UIs). The UIs are associated with a client device, such as the client device 110 executing the web client 112 (e.g., an Internet browser), which may be in communication with the networked system 102. The UIs may also be associated with one or more applications executing on the client device 110, such as a mobile application or operating system designed for interacting with the networked system 102 or with a third-party application 132 hosted by a third-party server 130.

The client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in the client device 110, then this application is configured to locally provide the user interface and at least some of the functionalities with the application configured to communicate with the networked system 102, on an as needed basis, for data or processing capabilities not locally available (e.g., access to a database of published items, to authenticate a user, to verify a method of payment, to setup an A/B or A/B/C test). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture but interacts with the network architecture via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

In some embodiments, the user 106 is a potential user, buyer, or customer (collectively referred to as "potential user") that uses the client device 110 to search publications and listings, make offers, and complete payment transactions. For these users 106, the networked system 102 maintains a user profile or account for each user 106. The user profile stores information about the user including, but not limited to, demographics (e.g., gender, age, location, income), search or browsing history, and previous operations or transactions with the networked system 102.

In other embodiments, the user 106 is a third-party user of the networked system 102 (e.g., a third-party seller publishing item listings for items for sale via the networked system 102). The networked system 102 also maintains a user profile or account for these users, but the information associated with the user profile is different. The user profile for third-party users include, for example, past transactions, indication of publications or listings associated with the third-party, and current and previous tests conducted by the third-party.

Turning specifically to the networked system 102, an application program interface (API) server 120 and a web server 122 are coupled to, and provide programmatic and web interfaces respectively to, one or more application servers 140. The application server 140 hosts a publication system 142 and testing system 144, each of which may comprise one or more modules, applications, or engines, and which can be embodied as hardware, software, firmware, or any combination thereof. The application servers 140 are, in turn, coupled to one or more database servers 124 that facilitate access to one or more information storage repositories or databases 126. In one embodiment, the database 126 is a storage device that stores content (e.g., publications, store information, advertisements, user profiles, conducted A/B or A/B/C tests and results) that is used by the networked system 102.

In example embodiments, the publication system 142 publishes content (e.g., item listings) on a network (e.g., Internet). As such, the publication system 142 provides a number of publication functions and services to the user 106 that access the networked system 102. For example, the publication system 142 can host a marketplace application that provides a number of marketplace functions and services to users, such as publishing, listing, and price-setting mechanisms whereby the third-party user may list (or publish information concerning) goods or services (also collectively referred to as "items") for sale, a potential user or buyer can express interest in or indicate a desire to purchase such goods or services, and a price can be set for a transaction pertaining to the goods or services. However, it is noted that the publication system 142 may, in alternative embodiments, be associated with a non-marketplace environment such as an informational environment (e.g., search engine) or social networking environment.

The testing system 144 comprises a testing platform that provides a number of functions to perform or facilitate third-party testing (e.g., A/B testing) of their publications or item listings. The testing system 144 will be discussed in more detail in connection with FIG. 2.

The web client 112 accesses the publication system 142 and testing system 144 via the web interface supported by the web server 122. Similarly, the programmatic client 116 accesses the various services and functions provided by the publication system 142 and testing system 144 via the programmatic interface provided by the API server 120. The programmatic client 116 may, for example, be a seller application that enables third-party users to author and manage publications on the networked system 102 in an off-line manner, and to perform batch-mode communications between the programmatic client 116 and the networked system 102.

FIG. 1 also illustrates the third-party application 132 executing on the third-party server 130 that can exchange information with the application server 140 or with the client device 110. The third-party application 132 has programmatic access to the networked system 102 via a programmatic interface provided by the API server 120. The third-party application 132 is associated with any organization that conducts transactions with, or provides services to, the application server 140 or to the user 106 of the client device 110. The users associated with the third-party server 130 (also referred to herein as a "third-party user") also comprise users or sellers that publish listings via the publication system 142. In various embodiments, these third-party users are entities that may have more items and more publications to manage. As such, these third-party users utilize a third-party server 130 to perform third-party operations instead of using the client device 110. Thus, any number of third-party users may be in the network environment using either their client device 110 or third-party server 130.

While the publication system 142 and testing system 144 are shown in FIG. 1 to form part of the networked system 102, it will be appreciated that, in alternative embodiments, the publication system 142 or testing system 144 may form part of a separate service that is distinct from the networked system 102. Further, while the client-server-based network environment 100 shown in FIG. 1 employs a client-server architecture, the present inventive subject matter is of course not limited to such an architecture, and could equally well find application in a distributed, or peer-to-peer, architecture system, for example. The publication system 142 and testing system 144 can also be implemented as standalone software programs, which do not necessarily have networking capabilities.

Figure 2:
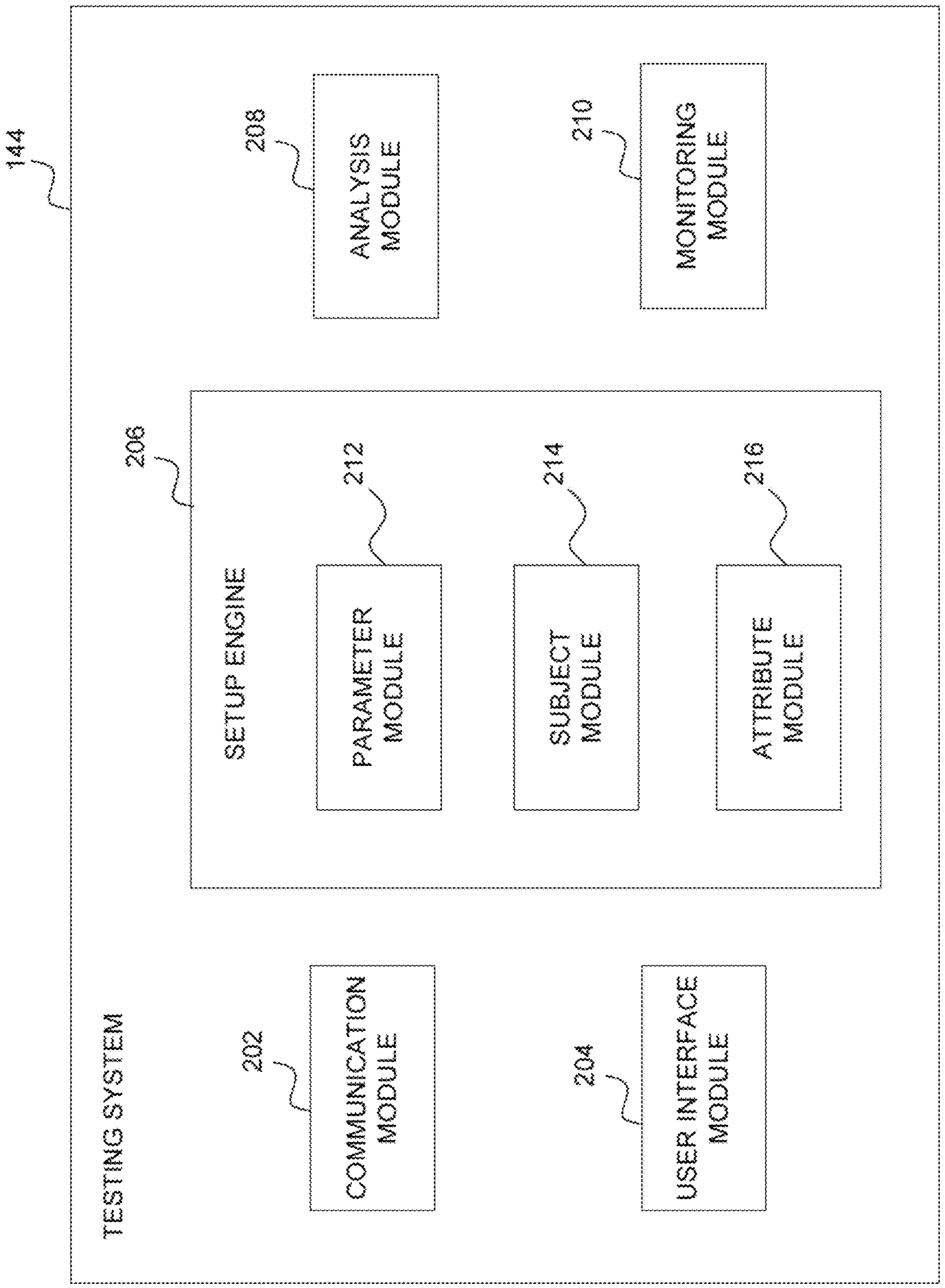
FIG. 2 is a block diagram illustrating components of a testing system, according to some example embodiments.

FIG. 2 is a block diagram illustrating components of the testing system 144, according to some example embodiments. In example embodiments, the testing system 144 comprises components that allow third-party users to setup and run tests (e.g., A/B or A/B/C tests) on the networked system 102. To enable these operations, the testing system 144 comprises a communications module 202, a user interface module 204, a setup engine 206, an analysis module 208, and a monitoring module 210 all configured to communicate with each other (e.g., via a bus, shared memory, or a switch). The testing system 144 may also comprise other components (not shown) that are not pertinent to example embodiments. Furthermore, any one or more of the components (e.g., engines, modules, storage) described herein may be implemented using hardware (e.g., a processor of a machine) or a combination of hardware and software. Moreover, any two or more of these components may be combined into a single component, and the functions described herein for a single component may be subdivided among multiple components.

The communications module 202 manages exchange of communications with the client device 110 and third-party servers 130 (also referred to herein as a "user device"). Specifically, the communications module 202 receives an indication to initiate a test. In response, the communication module 202 works with the user interface module 204 to present a setup user interface. The communication module 202 then receives, via the setup user interface, one or more parameters for the test, a subject of the test, and at least one attribute to be tested (e.g., a variable to be changed in one or more test publications). Further still, the communication module 202 communications (e.g., causes presentation of) recommendations for adjusting the test. Upon completion of the test, the communication module 202 communicates results of the test.

The user interface module 204 generates and causes presentation (e.g., via the communications module 202) of the setup user interface and a results user interface. In example embodiments, the setup user interface includes one or more fields that allow the third-party user to establish parameters for the test and to identify a subject of the test (e.g., a particular publication, a particular item of a publication, a category of items or publications). The setup user interface also includes one or more fields that allow the third-party user to indicate one or more attributes to be tested using test publications (e.g., different versions of the publication). Upon completion of the test, the user interface module 204 generates and causes presentation (e.g., via the communications module 202) of the results user interface. The results user interface presents an analysis of the testing and, in some embodiments, one or more recommendations for adjusting the publication for all users based on the results.

The setup engine 206 is configured to establish the test (e.g., A/B test or A/B/C test) for the third-party user. Accordingly, the setup engine 206 comprises a parameter module 212, a subject module 214, and an attribute module 216. Each of the modules 212-216 of the setup engine 206 manages a different element of the test.

Specifically, the parameter module 212 manages the test parameters for the test. The test parameters include, for example but not limited to, type of population to be tested (e.g., by age, by gender, by location), percentage of population (e.g., test for 10% of users), one or more sites of a multi-site networked system 102 (e.g., testing only on the U.S. site and not a U.K. site), or a duration of the test. Based on the inputs received from the third-party user via the setup user interface, the parameter module 212 randomly divides potential users (e.g., potential buyers) into subsets, whereby each subset receives a different version of the publication. For example, if the third-party user wants to test a publication selling a dress with 10% of likely buyers, the parameter module 212 randomly determines 10% of women users (e.g., because women are most likely to be the potential buyer of a dress) to present the test publication (e.g., the remaining 90% are presented with the original publication without the attribute change). In another example, if the third-party user indicates test parameters that include running the test for 10 days in the U.K. only, the parameter module 212 randomly selects appropriate users on the U.K. site of the networked system 102 to present the test publication during the 10 days. The determination of the subset of potential users can occur at any time such as when the versions of the publication are generated, when the publications are posted to the publication system 142, or when potential users request to view the publication at runtime.

The subject module 214 manages the publication(s) to be tested. In some embodiments, the third-party user indicates a specific item listing or publication (e.g., via a field in the setup user interface) that the third-party user wants to test. In other embodiments, the third-party user indicates a category (e.g., of items or item listings) to be tested. For example, if the third-party user wants to see the impact of providing free shipping for groceries, then the subject module 214 identifies all publications or item listings of the third-party user that are categorized under groceries.

The attribute module 216 manages the attribute(s) to be tested and generates the test publication(s) (e.g., different versions of the original publication). The attributes comprise, for example, a price, a return policy, a shipping fee, one or more words in a title, one or more words in a description of a publication, a layout of the publication, an image shown in the publication, one or more colors used in the publication, or any other element found in a publication. Continuing with the free shipping for groceries example, the attribute module 216 changes the shipping to free in the test publication or listing. In another example, the third-party user wants to see the impact of reducing prices by 5% (e.g., an attribute) for all electronics (e.g., a subject) for 5 days (e.g., a test parameter). Therefore, the attribute module 216 generates test publications for all electronic publications of the third-party user with prices reduced by 5% from a corresponding original publication. The third-party user can also indicate whether to lower the price gradually (e.g., 1% a day), to lower the price to a second price for the duration of the test, or some other method of adjusting the price. In a further example, the attribute module 216 can generate a test publication having a different return policy (e.g., free returns). In some cases, the third-party user wants to test a change in description or title of the publication. In these cases, the attribute module 216 receives the changed description or title from the user and generates the test publication using the indicated change.

In example embodiments, the third-party user can conduct multiple tests (e.g., A/B/C testing) at the same time for a same subject (e.g., a same original publication or item listing). For example, a first test publication tests for free shipping while a second test publication tests for free returns and a third test publication tests for a 5% reduction in price over a same duration. The set-up user interface provides an option for the third-party user to establish the multiple tests (e.g., enter a different attribute to be changed for each test publication). In these cases, a first sub-population of users may receive the original publication, a second sub-population of users receives a free shipping publication, a third sub-population of users receives a free returns publication, and a fourth sub-population of user receives a price reduction publication. Alternatively, the third-party user may run the multiple tests without the original publication (e.g., intends to change the original publication to one of the test publications). As such, a first sub-population of users receives a free shipping publication, a second sub-population of users receives a free returns publication, and a third sub-population of user receives a price reduction publication. By running multiple tests at the same time, the third-party user can determine which attribute change is the most meaningful between a plurality of attribute changes or provides the best results (e.g., most views, most click-thus, most sales).

In example embodiments, the analysis module 208 analyzes the setup inputs (e.g., parameter(s), subject, attribute(s)) to determine if any adjustments should be made prior to testing. In particular, the analysis module 208 determines a confidence level of results based on the input parameter(s), subject, and attribute(s). The confidence level is determined based on past tests performed for a same or similar subject (e.g., item or category of item). For example, if the input parameter is a duration of 5 days, the analysis module 208 can determine that, based on historical data, meaningful statistical significance is likely determined if the test is conducted for 10 days. As such, the analysis module 208 can provide recommendations on how to run the test based on the third-party inputs (e.g., how to design the test, how long to run the test, population to test on, how many transactions before getting certain significant results). That is, the analysis module 208 can provide a recommendation about what parameter to use or attribute to change based on historical data. The recommendation is presented to the third-party user by the user interface module 204 via the communications module 202.

The monitoring module 210 monitors interactions with an original publication and/or one or more test publications, whereby each test publication has a different attribute compared to the original publication. In example embodiments, the monitoring module 210 detects each interaction by a potential user with the original publication (which may be referred to, in some cases, as a "first version of the publication") or a test publication (e.g., a different version of the publication). The interaction can comprise one or more of viewing the publication, requesting more information regarding an item of the publication, click-thrus, or purchasing the item of the publication. The monitoring module 210 determines the number and type of each interaction with each publication.

The analysis module 208 also analyzes the results of the test and provides results and recommendations to the third-party user. As such, the analysis module 208 accesses the data compiled by the monitoring module 210 and determines statistics for presentation to the third-party user. For example, the third-party user may have tested giving free shipping to half the population for seven days. The result is that there is an increase in sales by 0.5%. Therefore, the analysis module 208 provides these results and may recommend providing free shipping to all users.

Figure 3:
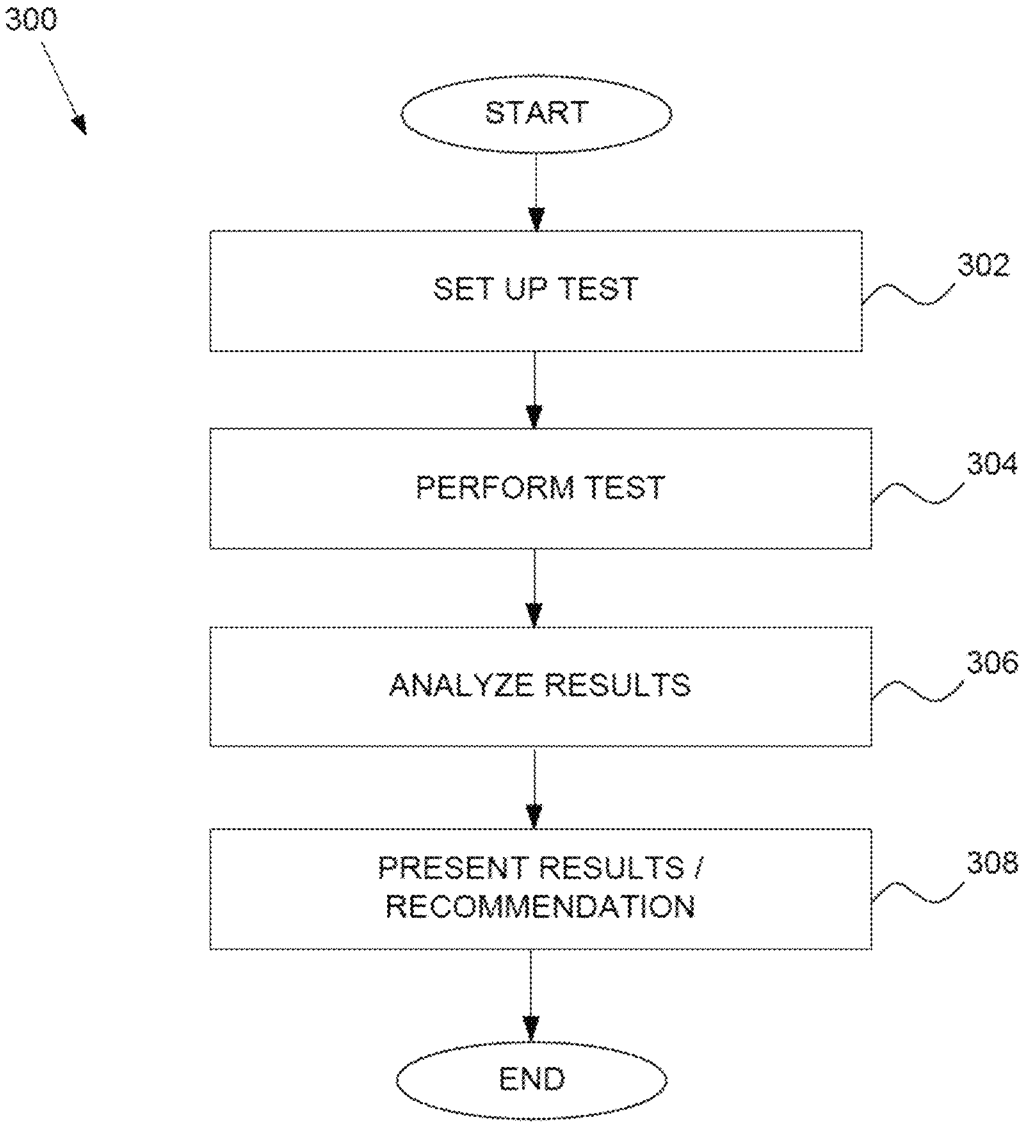
FIG. 3 is a flowchart illustrating operations of a method for performing third-party testing in the networked environment, according to some example embodiments.

FIG. 3 is a flowchart illustrating operations of a method 300 for performing third-party testing in the networked environment, according to some example embodiments. Operations in the method 300 may be performed by the testing system 144, using components described above with respect to FIG. 2. Accordingly, the method 300 is described by way of example with reference to the testing system 144. However, it shall be appreciated that at least some of the operations of the method 300 may be deployed on various other hardware configurations or be performed by similar components residing elsewhere in the network environment 100. Therefore, the method 300 is not intended to be limited to the testing system 144.

In operation 302, the test (e.g., A/B test) is set up. In example embodiments, a setup user interface is presented, by the user interface module 204 via the communications module 202, to the third-party user through which the third-party user indicates one or more test parameters, a subject to be tested, and at least one attribute to be tested. One or more test publications are then generated based on the user inputs. Operation 302 will be discussed in more detail in connection with FIG. 4 below.

In operation 304, the testing is performed. Operation 304 will be discussed in more detail in connection with FIG. 5 below.

In operation 306, the analysis module 208 analyzes the results of the test. In example embodiments, the analysis module 208 accesses data stored from the monitoring of interactions with the different versions of the publication (e.g., an original publication and/or one or more test publications). The data may indicate a number of views of each publication and/or whether a user viewing a particular publication performed a further action with respect to an item presented in the particular publication (e.g., purchased the item, downloaded the item, click-thru on the item, requested more information on the item). These further actions represent an interaction or conversion of the corresponding publication. The analysis module 208 examines these conversions and determines a change in a conversion rate based on the changed attribute for each test publication.

In some embodiments, the analysis module 208 determines, in operation 306, a recommendation to present to the third-party user. For example, the third-party user may have tested reducing the price by 5% to half the population for ten days. The result is that there is an increase in 2.5% in sales. Therefore, the analysis module 208 recommends lowering the price 5% for all users.

In operation 308, the results and, if provided, the recommendation are presented to the third-party user. In example embodiments, the user interface module 204 generates and causes presentation, via the communications module 202, of a results user interface to the third-party user on which the results and the recommendation are presented.

Figure 4:
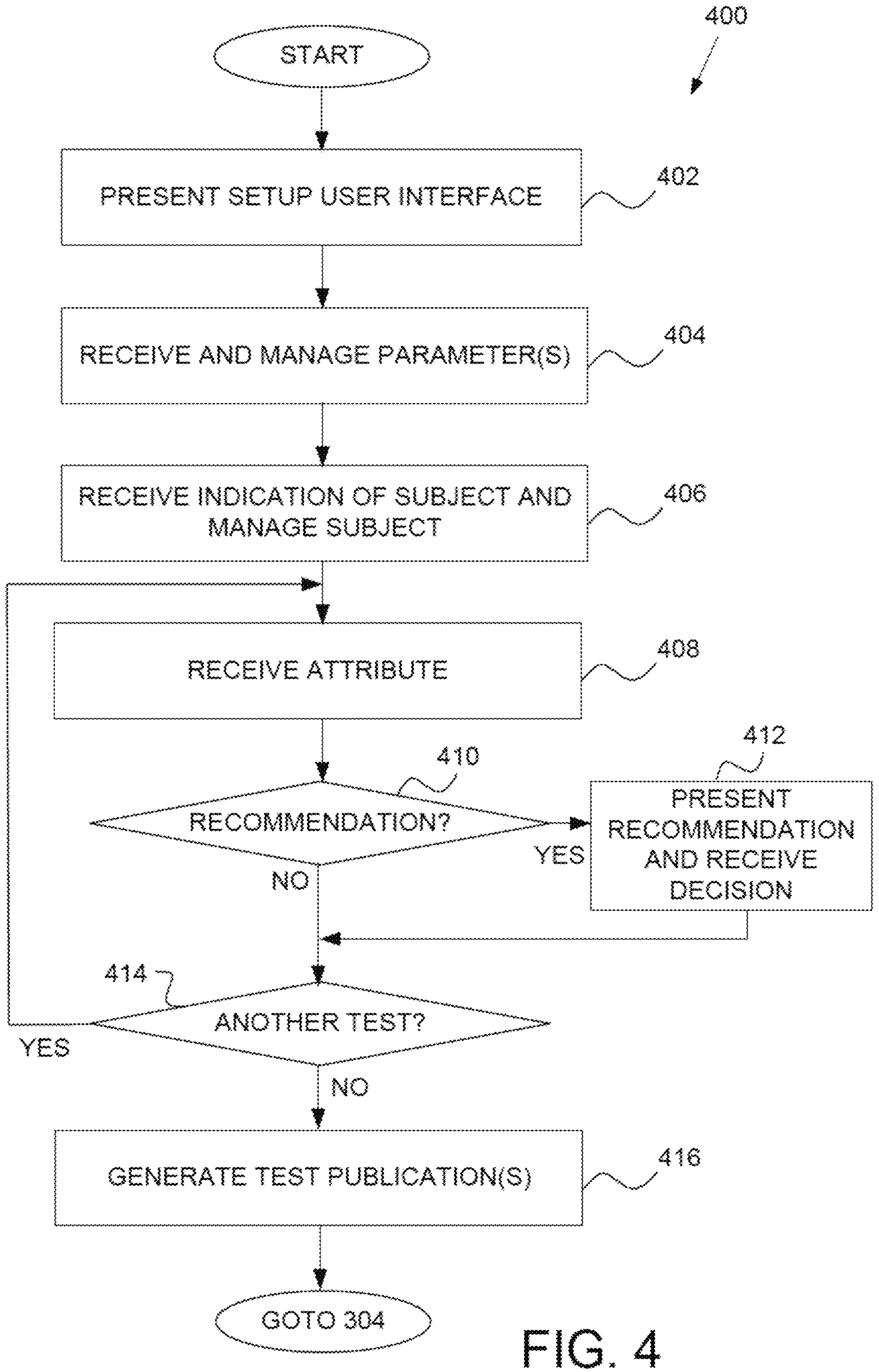
FIG. 4 is a flowchart illustrating operations of a method for setting up a third-party test, according to some example embodiments.

FIG. 4 is a flowchart illustrating operations of a method 400 (e.g., operation 302) for setting up a third-party test, according to some example embodiments. Operations in the method 400 may be performed by the testing system 144, using components described above with respect to FIG. 2. Accordingly, the method 400 is described by way of example with reference to the testing system 144. However, it shall be appreciated that at least some of the operations of the method 400 may be deployed on various other hardware configurations or be performed by similar components residing elsewhere in the network environment 100. Therefore, the method 400 is not intended to be limited to the testing system 144.

In operation 402, the user interface module 204 causes presentation of the setup user interface. In example embodiments, the setup user interface includes one or more fields that allow the third-party user to set up parameters for the test. The setup user interface also includes one or more fields that allow the third-party user to indicate one or more attributes to be tested in one or more test publications and the subject of the test (e.g., publication, item of the publication, category of items or publications).

In operation 404, the parameter module 212 receives one or more parameters via the setup user interface and manages the parameter(s). The parameters can include, for example, type of population (e.g., by age, by gender, by location) to be tested, percentage of population (e.g., test for 10% of users), one or more sites of a multi-site networked system 102 (e.g., testing only on the U.S. site and not a U.K. site of the networked system), a specific location/region, or a duration of the test. Based on the parameter(s), the parameter module 212 randomly divides up users (e.g., potential users or buyers). As such, the parameter module 212 splits a population into sub-populations whereby each sub-population will be presented a different version of the publication (e.g., the original publication or one of the different versions). For example, if the third-party user indicates to test a publication for an item for 10% of buyers, the parameter module 212 randomly determines 10% of the population to present the test publication and the remaining 90% of the population is presented with the original publication (without the changed attribute).

Alternatively, if the third-party user indicates to perform the test only on the U.S. site without an indication of how the population should be divided, the parameter module 212 splits the population by the number of versions of the publication. For example, if the third-party user wants to test a single change in attribute resulting in an original publication (a first version of the publication) and a test publication (a second version of the publication), the parameter module 212 splits the population randomly into roughly 50/50. If a further attribute is to be tested at the same time resulting in a third version of the publication, the parameter module splits the population randomly in thirds.

It is noted that the determination of the subpopulation can occur at any time after the parameter(s) are received. In some embodiments, the population can be divided into the subpopulation at runtime on the publication system 142. In other embodiments, the population can be divided into the subpopulation prior to runtime (e.g., any time before the test publication is generated).

In operation 406, the subject module 214 receives an indication of the subject of the test and manages the publication to be tested. In some embodiments, the third-party user indicates a specific item or publication (e.g., via a field in the setup user interface) that the third-party user wants to test. In other embodiments, the third-party user indicates a category to be tested. For example, if the third-party user indicates that they want to test all their items or publications in the category of men's shoes, then the subject module 214 identifies all publications of the third-party user that are published or associated with a men's shoe category of the networked system 102.

In operation 408, the attribute module 216 receives an attribute to be tested (e.g., changed in a test publication). The attribute can comprise, for example, a price, a return policy, a shipping fee, one or more words in a title, one or more words in a description of a publication, or any other element found in a publication. As an example, the third-party user can indicate they would like to test whether changing the title of the publication to emphasize free shipping (e.g., add "free shipping" to title) will increase sales.

In operation 410, the received setup inputs (e.g., parameter, subject, attribute) are analyzed to determine if a recommendation to adjust one or more of the received inputs should be presented to the third-party user. In example embodiments, the analysis module 208 determines a confidence level of results based on the input parameter(s), subject, and attribute(s). The confidence level is determined based on historical data accessed from the database 126 and includes past tests performed for a same or similar subject (e.g., item or category of item). For example, if the input parameter is a duration of 7 days, the analysis module 208 can determine that for that subject or category, based on the historical data, meaningful statistical significance is likely determined if the test is conducted for 10 or more days. Thus, the analysis module 208 may compare the inputs with inputs used in the past in successful tests to identify one or more inputs that should be changed to increase success for the new test In example embodiments, the analysis module 208 performs statistical calculations in order to determine what should be the sample size of the test (and hence the duration of the test) to conclude meaningful results. In order to calculate the correct sample size, the analysis module 208 estimates the mean effect between two subpopulations in the test (e.g., if a speculated mean effect is very high there is no need for a large sample size or long duration). Using rich historical data of third-party A/B and A/B/C tests of similar items, the analysis module 208 can estimate what is the expected mean effect between treatment and control and estimate better what should be the sample size needed (and hence the duration needed).

If a determination is made to present the recommendation, the user interface module 204 causes presentation (e.g., on the setup user interface) of the recommendation in operation 412. As such, the analysis module 208 can provide, via the setup user interface, recommendations on how to run the test based on the third-party inputs (e.g., how to design the test, how long to run the test, population to test on, how many transactions before getting certain significant results). Accordingly, the analysis module 208 provides the recommendation about what parameter(s) to use or attribute to change. The third-party user can decide to accept the recommendation or ignore it.

If a determination is made to not present any recommendations, then the setup engine 206 determines whether the user wants to run multiple tests in operation 414. If the third-party user intends to run multiple tests, then the method 400 returns to operation 408 to receive a next attribute. In one embodiment, the determination is based on the third-party user selecting an option on the setup user interface to test a second or next attribute at the same time. When the third-party user selects this option, the setup user interface provides a field to enter or select the next attribute to test.

Once all the third-party user inputs are received and no additional test attributes are provided, the attribute module 216 generates the test publications in operation 416. In some cases, an original publication is maintained as the first version of the publication. The attribute module 216 generates a second version or test publication with the attribute indicated in operation 408. If there are additional tests to be run at the same time, the attribute module 216 generates further versions of the publication, one for each attribute to be changed. In the multiple test embodiment, the third-party user may indicate, via the setup user interface, that the original publication should not be used in the test. As a result, a first test publication is the first version of the publication while a second test publication is the second version of the publication. The publications are then provided to the publication system 142 to be presented to the randomly determined subset of users.

Figure 5:
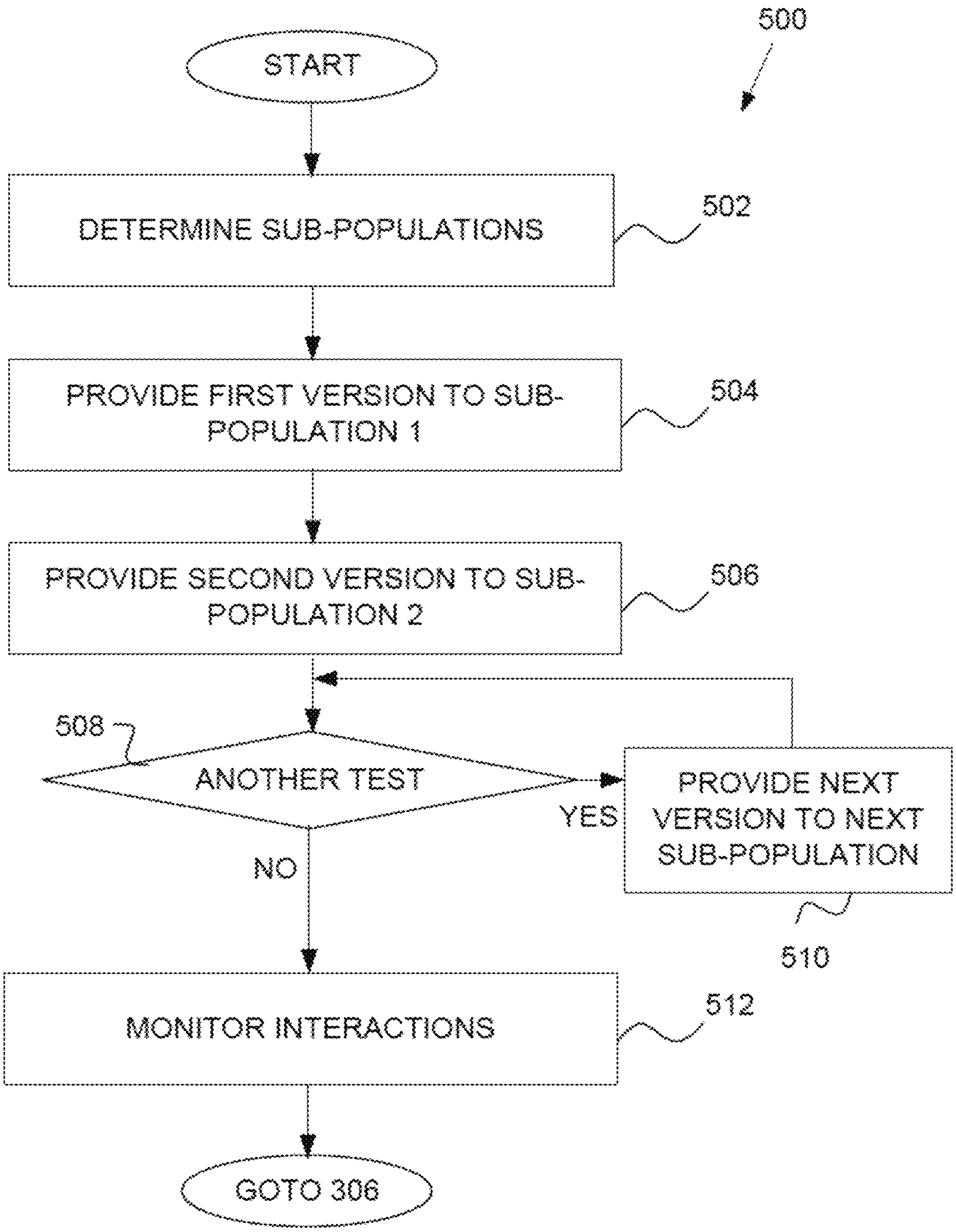
FIG. 5 is a flowchart illustrating operations of a method for running the test, according to some example embodiments.

FIG. 5 is a flowchart illustrating operations of a method for running the test, according to some example embodiments. Operations in the method 500 may be performed by the networked system 102. Accordingly, the method 500 is described by way of example with reference to the networked system 102. However, it shall be appreciated that at least some of the operations of the method 500 may be deployed on various other hardware configurations or be performed by similar components residing elsewhere in the network environment 100. Therefore, the method 500 is not intended to be limited to the networked system 102.

In operation 502, the parameter module 212 determine sub-populations or subsets of user to present the different versions of the publication. For instance, users can be randomly divided into the subsets based on demographics (e.g., location, age, gender, income, spending history) such that the subsets statistically reflect the overall population or a population type (e.g., women users, users between the age of 20-30). As previously discussed, the determination of the subset of users may be performed prior to runtime (e.g., when setting up the test, after the versions of the publication are generated) in which case, operation 502 is not needed.

In operation 504, the publication system 142 causes presentation of an original publication or a first version of the publication to a first sub-population (e.g., a first subset of users or potential buyers).

In operation 506, the publication system 142 causes presentation of a second version of the publication (e.g., a test publication) to a second sub-population (e.g., a second subset of users or potential buyers).

In operation 508, a determination is made if there is a further test publication (e.g., a third version of the publication). If there is a further test publication, the further test publication is provided to the next sub-population (e.g., a third subset of users or potential buyers) in operation 510. Operations 508 and 510 are repeated until all test publications have been provided to their designated sub-population.

If no further test publications are determined in operation 508, then the monitoring module 210 monitors interactions with the different versions of the publication, whereby each version of the publication has a different attribute compared to an original publication. The interactions can comprise one or more of viewing the publication, requesting more information regarding an item of the publication, click-thrus, or purchasing the item of the publication. The monitoring module 210 determines the number and type of each interaction with each publication (e.g., original and test publications).

While the operations of the method 500 are shown in FIG. 5 to be performed serially, in an actual runtime environment, any two or more of the operations of the method 500 may be performed simultaneously. That is, for example, the different versions of the publication are presented to their respective subpopulation at the same time, while the monitoring module 210 concurrently monitors all the interactions.

Figure 6:
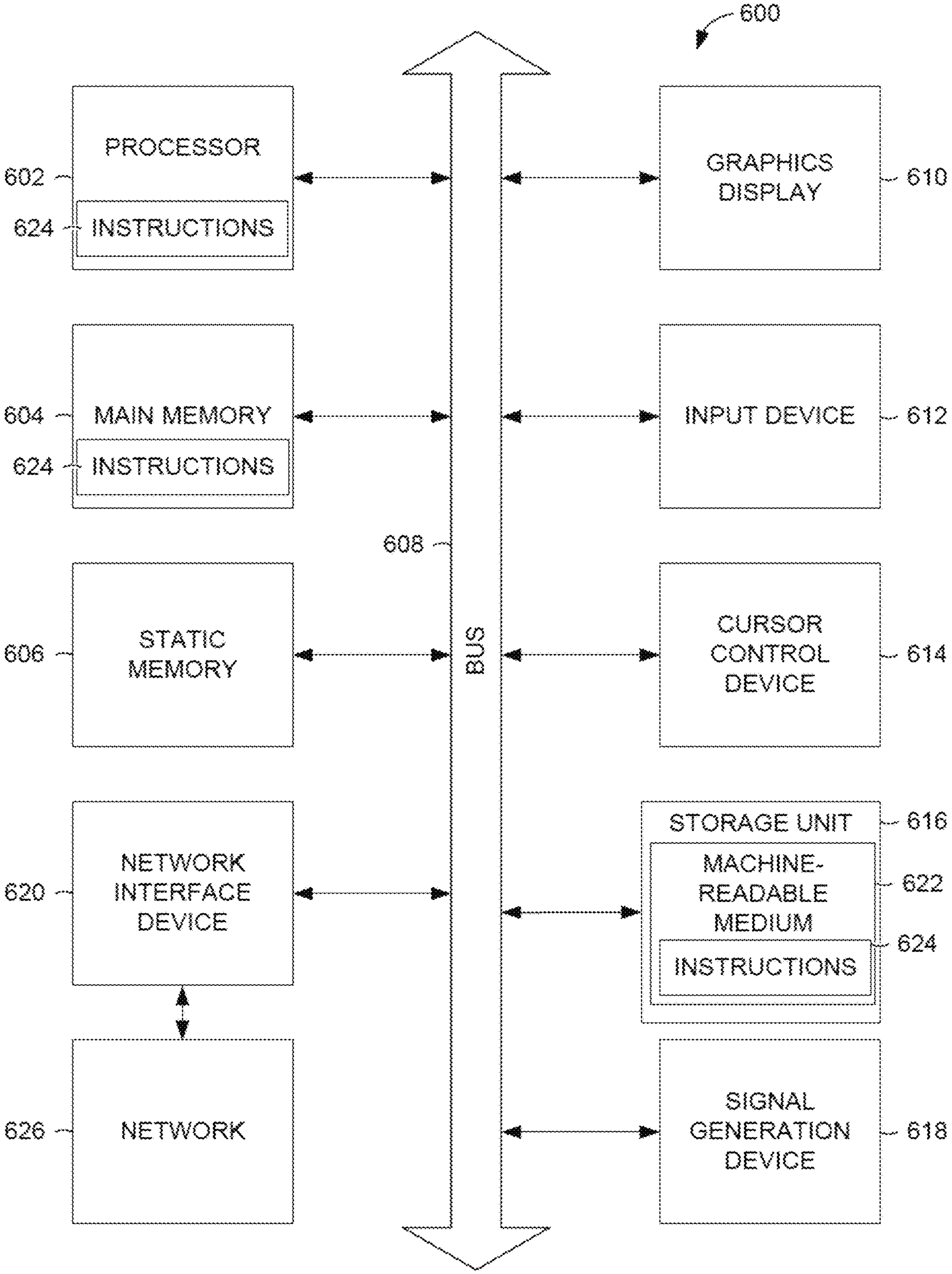
FIG. 6 is a block diagram illustrating components of a machine, according to some example embodiments, able to read instructions from a machine-readable medium and perform any one or more of the methodologies discussed herein.

FIG. 6 illustrates components of a machine 600, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagrams of FIG. 3 through FIG. 5. In one embodiment, the instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 1002 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-readable medium 622 (e.g., a tangible machine-readable storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-readable media (e.g., tangible and non-transitory machine-readable media). The instructions 624 may be transmitted or received over a network 626 via the network interface device 620.

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 622 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for conducting a test on a third-party testing platform. The method comprises causing presentation, by a networked system, of a setup user interface to a third-party user on the third-party testing platform, the setup user interface including a field for indicating an attribute of a publication for an item published by the third-party user to be tested; receiving, by the networked system via the setup user interface from the third-party user, an indication of the attribute, a subject to be tested, and one or more test parameters, the one or more test parameters including a duration for the test; in response to receiving the attribute change, applying, by the networked system, the attribute change to a first version of the publication for the item to generate a second version of the publication, the second version being a test publication to test the attribute change; causing presentation of the first version to a first subset of potential users and the second version to a second subset of potential users during the duration, the first subset of potential users and second subset of potential users comprising different potential users; monitoring interactions with both the first version by the first subset of potential users and the second version by the second subset of potential users during the duration; based on the monitoring, analyzing the interactions to determine results of the test; and causing presentation of the results to the third-party user.

In example 2, the subject matter of example 1 can optionally include concurrently with the receiving of the indication of the attribute change, receiving an indication of a second attribute change; and based on the second attribute change, applying the second attribute change to the first version of the publication of the item to generate a third version of the publication; wherein the causing presentation of the first version of the publication to the first subset of potential users and the second version to the second subset of potential users during the duration further comprises causing presentation of the third version to a third subset of potential users that is different from the first subset of potential users and the second subset of potential users, and wherein the monitoring interactions with both the first version by the first subset of potential users and the second version by the second subset of potential users during the duration further comprises monitoring interactions with the third version by the third subset of potential users during the duration.

In example 3, the subject matter of examples 1-2 can optionally include wherein the subject to be tested is a category of items to which the item belongs; and the applying the attribute change to the first version to generate the second version of the publication comprises applying the attribute change to a first version of publications of every item in the category.

In example 4, the subject matter of examples 1-3 can optionally include, based on the indication of the attribute to change, the subject to be tested, and the one or more test parameters, determining a recommendation to adjust one of the attribute, subject, or one or more test parameters; and causing presentation of the recommendation to adjust one of the attribute, subject, or one or more test parameters.

In example 5, the subject matter of examples 1-4 can optionally include wherein the attribute change comprises a change in price.

In example 6, the subject matter of examples 1-5 can optionally include wherein the attribute change comprises a change of one or more words in a title or description of the publication of the item.

In example 7, the subject matter of examples 1-6 can optionally include wherein the attribute change comprises a change in return policy or shipping fee.

In example 8, the subject matter of examples 1-7 can optionally include wherein the attribute change comprises a change to an image, layout, or color of the publication of the item.

In example 9, the subject matter of examples 1-8 can optionally include wherein the one or more test parameters further comprises a parameter used to split the potential users into two or more subsets of potential users.

In example 10, the subject matter of examples 1-9 can optionally include wherein the causing presentation of the results further comprises providing a recommendation to adjust the first version of the publication based on the results of the test.

Example 11 is a system for conducting a test on a third-party testing platform. The system includes one or more processors and a storage device storing instructions that, when executed by the one or more hardware processors, causes the one or more hardware processors to perform operations comprising causing presentation of a setup user interface to a third-party user on the third-party testing platform, the setup user interface including a field for indicating an attribute of a publication for an item published by the third-party user to be tested; receiving, via the setup user interface from the third-party user, an indication of the attribute, a subject to be tested, and one or more test parameters, the one or more test parameters including a duration for the test; in response to receiving the attribute change, applying the attribute change to a first version of the publication for the item to generate a second version of the publication, the second version being a test publication to test the attribute change; causing presentation of the first version to a first subset of potential users and the second version to a second subset of potential users during the duration, the first subset of potential users and second subset of potential users comprising different potential users; monitoring interactions with both the first version by the first subset of potential users and the second version by the second subset of potential users during the duration; based on the monitoring, analyzing the interactions to determine results of the test; and causing presentation of the results to the third-party user.

In example 12, the subject matter of example 11 can optionally include concurrently with the receiving of the indication of the attribute change, receiving an indication of a second attribute change; and based on the second attribute change, applying the second attribute change to the first version of the publication of the item to generate a third version of the publication; wherein the causing presentation of the first version of the publication to the first subset of potential users and the second version to the second subset of potential users during the duration further comprises causing presentation of the third version to a third subset of potential users that is different from the first subset of potential users and the second subset of potential users, and wherein the monitoring interactions with both the first version by the first subset of potential users and the second version by the second subset of potential users during the duration further comprises monitoring interactions with the third version by the third subset of potential users during the duration.

In example 13, the subject matter of examples 11-12 can optionally include wherein the subject to be tested is a category of items to which the item belongs; and the applying the attribute change to the first version to generate the second version of the publication comprises applying the attribute change to a first version of publications of every item in the category.

In example 14, the subject matter of examples 11-13 can optionally include, based on the indication of the attribute to change, the subject to be tested, and the one or more test parameters, determining a recommendation to adjust one of the attribute, subject, or one or more test parameters; and causing presentation of the recommendation to adjust one of the attribute, subject, or one or more test parameters.

In example 15, the subject matter of examples 11-14 can optionally include wherein the attribute change comprises a change in price, a change of one or more words in a title or description of the publication of the item, a change in return policy, a change in a shipping fee, or a change to an image, layout, or color of the publication of the item.

In example 16, the subject matter of examples 11-15 can optionally include wherein the one or more test parameters further comprises a parameter used to split the potential users into two or more subsets of potential users.

In example 17, the subject matter of examples 11-16 can optionally include wherein the causing presentation of the results further comprises providing a recommendation to adjust the first version of the publication based on the results of the test.

Example 18 is a machine-storage medium for conducting a test on a third-party testing platform. The machine-storage medium configures one or more processors to perform operations comprising causing presentation of a setup user interface to a third-party user on the third-party testing platform, the setup user interface including a field for indicating an attribute of a publication for an item published by the third-party user to be tested; receiving, via the setup user interface from the third-party user, an indication of the attribute, a subject to be tested, and one or more test parameters, the one or more test parameters including a duration for the test; in response to receiving the attribute change, applying the attribute change to a first version of the publication for the item to generate a second version of the publication, the second version being a test publication to test the attribute change; causing presentation of the first version to a first subset of potential users and the second version to a second subset of potential users during the duration, the first subset of potential users and second subset of potential users comprising different potential users; monitoring interactions with both the first version by the first subset of potential users and the second version by the second subset of potential users during the duration; based on the monitoring, analyzing the interactions to determine results of the test; and causing presentation of the results to the third-party user.

In example 19, the subject matter of example 18 can optionally include wherein the subject to be tested is a category of items to which the item belongs; and the applying the attribute change to the first version to generate the second version of the publication comprises applying the attribute change to a first version of publications of every item in the category.

In example 20, the subject matter of examples 18-19 can optionally include, based on the indication of the attribute to change, the subject to be tested, and the one or more test parameters, determining a recommendation to adjust one of the attribute, subject, or one or more test parameters; and causing presentation of the recommendation to adjust one of the attribute, subject, or one or more test parameters.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:

generating and causing presentation, by a testing system embodied on a server, of a setup user interface on a client device on a testing platform by communicating the setup user interface over a network to the client device;

receiving, by the testing system via the setup user interface, setup inputs for a publication to be tested from the client device, the setup inputs including an attribute and one or more test parameters;

in response to receiving the setup inputs and prior to testing the publication, updating the setup user interface to display a first recommendation indicating a different attribute to use based on the testing system analyzing the attribute and the one or more test parameters of the setup inputs;

generating, by the testing system, a second version of the publication by applying the different attribute indicated by the first recommendation to a first version of the publication, the second version being a test publication to test the different attribute;

causing presentation of the first version to a first subset of client devices associated with potential users and the second version to a second subset of client devices associated with different potential users;

testing the publication, by the testing system, to determine results of interactions of the first subset of client devices with the first version and interactions of the second subset of client devices with the second version, the results indicating a difference in the interactions between the first version and the second version;

based on the results of the testing indicating the difference in the interactions between the first version and the second version, determining whether to provide a second recommendation to apply the different attribute tested in the second version to the first version of the publication; and generating and causing presentation, by communicating over the network for display on the client device, of a results user interface that displays the results indicating the difference in the interactions and, in response to determining that the second recommendation is to be provided, displays the second recommendation.

2. The method of claim 1, further comprising:

determining, by the testing system and prior to testing the publication, a confidence level of the results based on the one or more test parameters, the attribute, and past successful tests.

3. The method of claim 2, further comprising:

identifying an alternative attribute used in the past successful tests, wherein the first recommendation indicates the alternative attribute as the different attribute to use based on the confidence level.

4. The method of claim 1, further comprising:

determining the first subset of client devices associated with the potential users and the second subset of client devices associated with the different potential users based on a parameter of the one or more test parameters.

5. The method of claim 1, further comprising:

determining a duration for the testing based on a parameter of the one or more test parameters, wherein the testing of the publication is performed for the duration.

6. The method of claim 1, wherein:

the difference in the interactions comprises a statistical difference in a conversion rate between the first version and the second version that is displayed in the results user interface; and the determining whether to provide the second recommendation is based on whether the statistical difference indicates an increase in the conversion rate for the second version relative to the first version.

7. The method of claim 1, wherein:

the setup inputs identify a subject to be tested comprising a category of items; and the generating the second version of the publication comprises generating respective second versions of respective first versions of publications of every item in the category by applying the different attribute indicated by the first recommendation to each respective first version.

8. The method of claim 7, wherein:

the testing comprises determining results of interactions with the respective first versions and the respective second versions of the publications of every item in the category; and the results indicate, for the publications of every item in the category, a difference in the interactions between the respective first versions and the respective second versions.

9. The method of claim 8, wherein:

the determining whether to provide the second recommendation comprises determining, based on the results for the publications of every item in the category, whether to recommend applying the different attribute to the respective first versions of the publications of every item in the category.

10. The method of claim 1, wherein the different attribute indicated by the first recommendation comprises:

a change in price;

a change of one or more words in a title or description of the publication;

a change in return policy or shipping fee; or a change to an image, layout, or color of the publication.

11. A system comprising:

one or more hardware processors; and a storage device storing instructions that, when executed by the one or more hardware processors, cause the one or more hardware processors to perform operations comprising:

generating and causing presentation, by a testing system embodied on a server, of a setup user interface on a client device on a testing platform by communicating the setup user interface over a network to the client device;

receiving, by the testing system via the setup user interface, setup inputs for a publication to be tested from the client device, the setup inputs including an attribute and one or more test parameters;

in response to receiving the setup inputs and prior to testing the publication, updating the setup user interface to display a first recommendation indicating a different attribute to use based on the testing system analyzing the attribute and the one or more test parameters of the setup inputs;

receiving, by the testing system via the updated setup user interface, an acceptance of the first recommendation from the client device;

in response to receiving the acceptance, generating, by the testing system, a second version of the publication by applying the different attribute indicated by the first recommendation to a first version of the publication, the second version being a test publication to test the different attribute;

causing presentation of the first version to a first subset of client devices associated with potential users and the second version to a second subset of client devices associated with different potential users;

testing the publication, by the testing system, to determine results of interactions of the first subset of client devices with the first version and interactions of the second subset of client devices with the second version, the results indicating a difference in the interactions between the first version and the second version;

based on the results of the testing indicating the difference in the interactions between the first version and the second version, determining whether to provide a second recommendation to apply the different attribute tested in the second version to the first version of the publication for all future potential users; and generating and causing presentation, by communicating over the network for display on the client device, of a results user interface that displays the results indicating the difference in the interactions and, in response to determining that the second recommendation is to be provided, displays the second recommendation.

12. The system of claim 11, wherein the operations further comprise:

determining, prior to testing the publication, a confidence level of the results based on the one or more test parameters, the attribute, and past successful tests.

13. The system of claim 12, wherein the operations further comprise:

identifying an alternative attribute used in the past successful tests, wherein the first recommendation indicates the alternative attribute as the different attribute to use based on the confidence level.

14. The system of claim 11, wherein the operations further comprise:

determining the first subset of client devices associated with the potential users and the second subset of client devices associated with the different potential users based on a parameter of the one or more test parameters.

15. The system of claim 11, wherein the operations further comprise:

determining a duration for the testing based on a parameter of the one or more test parameters, wherein the testing of the publication is performed for the duration.

16. The system of claim 11, wherein:

the difference in the interactions comprises a statistical difference in a conversion rate between the first version and the second version that is displayed in the results user interface; and the determining whether to provide the second recommendation is based on whether the statistical difference indicates an increase in the conversion rate for the second version relative to the first version.

17. The system of claim 11, wherein:

the setup inputs identify a subject to be tested, comprising a category of items; and the generating the second version of the publication comprises generating respective second versions of respective first versions of publications of every item in the category by applying the different attribute indicated by the first recommendation to each respective first version.

18. The system of claim 17, wherein:

the testing comprises determining results of interactions with the respective first versions and the respective second versions of the publications of every item in the category; and the results indicate, for the publications of every item in the category, a difference in the interactions between the respective first versions and the respective second versions.

19. The system of claim 18, wherein;

the determining whether to provide the second recommendation comprises determining, based on the results for the publications of every item in the category, whether to recommend applying the different attribute to the respective first versions of the publications of every item in the category for all future potential users.

20. A machine-storage medium storing instructions that, when executed by one or more processors of a machine, cause the one or more processors to perform operations comprising:

generating and causing presentation, by a testing system embodied on a server, of a setup user interface on a client device on a testing platform by communicating the setup user interface over a network to the client device;

receiving, by the testing system via the setup user interface, setup inputs identifying a category of items having respective publications to be tested, an attribute of the respective publications, and one or more test parameters;

in response to receiving the setup inputs and prior to testing the respective publications, updating the setup user interface to display a first recommendation indicating a different attribute to use in the respective publications of the items in the category based on the testing system analyzing the attribute and the one or more test parameters;

generating, by the testing system, respective second versions of respective first versions of the publications of every item in the category by applying the different attribute indicated by the first recommendation to each respective first version, the respective second versions being test publications to test the different attribute;

causing presentation of the respective first versions to a first subset of client devices associated with potential users and the respective second versions to a second subset of client devices associated with different potential users;

testing the respective publications, by the testing system, to determine results of interactions of the first subset of client devices with the respective first versions and interactions of the second subset of client devices with the respective second versions, the results indicating, for the publications of every item in the category, a difference in the interactions between the respective first versions and the respective second versions;

based on the results of the testing, determining whether to provide a second recommendation to apply the different attribute tested in the respective second versions to the respective first versions of the publications of every item in the category for future potential users; and generating and causing presentation, by communicating over the network for display on the client device, of a results user interface that displays the results and, in response to determining that the second recommendation is to be provided, displays the second recommendation.

* * * * *